(12) United States Patent
Zhang

(10) Patent No.: US 9,874,043 B2
(45) Date of Patent: Jan. 23, 2018

(54) SYSTEMS AND METHODS FOR DETECTING LEVER LOCKING POSITIONS ON LIQUID LEVEL CONTROLLERS

(71) Applicant: FISHER CONTROLS INTERNATIONAL LLC, Marshalltown, IA (US)

(72) Inventor: Lei Zhang, Singapore (SG)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 15/135,306

(22) Filed: Apr. 21, 2016

(65) Prior Publication Data

US 2016/0312495 A1 Oct. 27, 2016

Related U.S. Application Data

(60) Provisional application No. 62/150,714, filed on Apr. 21, 2015.

(51) Int. Cl.
*G08B 21/00* (2006.01)
*E05B 41/00* (2006.01)
(Continued)

(52) U.S. Cl.
CPC .............. *E05B 41/00* (2013.01); *E05B 47/00* (2013.01); *G01D 5/145* (2013.01); *G01D 11/20* (2013.01);
(Continued)

(58) Field of Classification Search
CPC .. E05B 41/00; E05B 47/00; E05B 2047/0069; G01D 11/20; G01D 5/145; G01B 7/14; G01F 23/32
(Continued)

(56) References Cited

U.S. PATENT DOCUMENTS

| 2,041,997 A | 5/1936 | Elfers |
| 5,544,000 A * | 8/1996 | Suzuki ................. F02D 11/106 |
| | | 324/207.2 |

(Continued)

FOREIGN PATENT DOCUMENTS

| WO | WO-2014032547 A1 | 3/2014 |
| WO | WO-2014066947 A1 | 5/2014 |

OTHER PUBLICATIONS

International Search Report for PCT/US2016/028582 dated Jul. 21, 2016.
Written Opinion for PCT/US2016/028582 dated Jul. 21, 2016.

*Primary Examiner* — Dhaval Patel
(74) *Attorney, Agent, or Firm* — Marshall, Gerstein & Borun LLP

(57) ABSTRACT

During shipment or other handling events, it is necessary to protect a liquid level controller from damage by manually engaging a lever locking mechanism to secure a lever assembly of the liquid level controller. The lever locking mechanism must be manually disengaged prior to calibrating or putting the liquid level controller into operation. To better facilitate an operator in monitoring the state of the lever locking mechanism, a sensor is coupled to the lever locking mechanism to detect whether the lever locking mechanism is in a locked or unlocked position. This information is then provided to the operator via a user interface. Compared to current visual inspections, the use of the sensor is more robust and reliable, and provides a simple non-contact method for determining the state of the lever locking mechanism.

21 Claims, 3 Drawing Sheets

(51) Int. Cl.
    *G01F 23/32*     (2006.01)
    *G01D 5/14*      (2006.01)
    *E05B 47/00*     (2006.01)
    *G01D 11/20*     (2006.01)
(52) U.S. Cl.
    CPC ...... *G01F 23/32* (2013.01); *E05B 2047/0069* (2013.01)
(58) Field of Classification Search
    USPC ......... 340/652, 426.24, 610; 324/207.2, 262, 324/326
    See application file for complete search history.

(56) References Cited

U.S. PATENT DOCUMENTS

| | | | |
|---|---|---|---|
| 7,190,159 B2* | 3/2007 | Galbreath | G01D 5/145 324/207.2 |
| 2014/0062466 A1 | 3/2014 | Thibault et al. | |
| 2015/0034848 A1* | 2/2015 | Penning | F16K 37/0033 251/65 |
| 2016/0086471 A1* | 3/2016 | Goldschmidt | G08B 21/14 340/610 |

* cited by examiner

SYSTEMS AND METHODS FOR DETECTING LEVER LOCKING POSITIONS ON LIQUID LEVEL CONTROLLERS

FIELD OF THE DISCLOSURE

This disclosure relates generally to instrument diagnostics and, more particularly, to systems and methods for detecting lever locking positions on liquid level controllers used in process control systems.

BACKGROUND

Process control systems typically employ a variety of field devices to monitor and control the flow of fluids. These field devices operate to detect, assess and/or alter various fluid parameters (e.g., pressure, temperature, level, etc.) within a process plant or system in order to ensure accurate process control.

One common field device is a liquid level controller, which is typically mounted to a process vessel that holds a fluid or liquid. The liquid level controller includes a rotatable lever assembly that is coupled to a displacer disposed inside the vessel. The displacer moves in response to changes in the fluid or liquid level, and conveys these changes to the controller via changes in the rotational position of the lever assembly.

To protect the liquid level controller from damage during shipment or other handling, an operator needs to prevent the lever assembly from rotating by manually engaging a locking mechanism. The locking mechanism must be disengaged before the liquid level controller is put into operation. However, if the operator forgets or neglects to disengage the locking mechanism, then the lever assembly may fail which in turn may cause the controller to become inoperable.

SUMMARY

In accordance with a first exemplary aspect of the invention, a computer-implemented method for detecting lever locking positions on a liquid level controller comprises detecting presence of a magnetic field produced by a feedback element of a sensor. The presence of the magnetic field is detected using a sensing element of the sensor, and the sensor is coupled to a lever locking mechanism of the liquid level controller. The method then determines that the lever locking mechanism is in a locked position if the presence of the magnetic field is detected. The method also determines that the lever locking mechanism is in an unlocked position if the presence of the magnetic field is not detected. Finally, the method provides the determined locked or unlocked position of the lever locking mechanism to a user.

In accordance with a second exemplary aspect of the invention, a non-transitory computer-readable storage medium comprises computer-readable instructions to be executed on one or more processors of a system for detecting lever locking positions on a liquid level controller. The instructions when executed cause the one or more processors to detect presence of a magnetic field produced by a feedback element of a sensor. The presence of the magnetic field is detected using a sensing element of the sensor, and the sensor is coupled to a lever locking mechanism of the liquid level controller. The instructions when executed then cause the one or more processors to determine that the lever locking mechanism is in a locked position if the presence of the magnetic field is detected. The instructions when executed also cause the one or more processors to determine that the lever locking mechanism is in an unlocked position if the presence of the magnetic field is not detected. Finally, the instructions when executed cause the one or more processors to provide the determined locked or unlocked position of the lever locking mechanism to a user.

In accordance with a third exemplary aspect of the invention, a system for detecting lever locking positions on a liquid level controller comprises a sensor coupled to a lever locking mechanism of the liquid level controller that includes a sensing element and a feedback element, and a device coupled to the sensor that includes a memory having instructions for execution on one or more processors. The instructions when executed by the one or more processors cause the device to use the sensing element to detect presence of a magnetic field produced by the feedback. The instructions when executed by the one or more processors then cause the device to determine that the lever locking mechanism is in a locked position if the presence of the magnetic field is detected. The instructions when executed by the one or more processors also cause the device to determine that the lever locking mechanism is in an unlocked position if the presence of the magnetic field is not detected. Finally, the instructions when executed by the one or more processors cause the device to provide the determined locked or unlocked position of the lever locking mechanism to a user.

In further accordance with any one or more of the foregoing first, second, or third exemplary aspects, the invention may include any one or more of the following further preferred forms.

In one preferred form, the sensing element is a reed switch with normally open contacts and the feedback element is a magnet.

In another preferred form, determining that the lever locking mechanism is in the locked position further comprises causing the normally open contacts to close if the presence of the magnetic field is detected, and generating a signal to close an electrical circuit.

In another preferred form, determine that the lever locking mechanism is in the unlocked position further comprises causing the normally open contacts to remain open if the presence of the magnetic field is not detected, and generating another signal to open the electrical circuit.

In another preferred form, the sensing element is a reed switch with normally closed contacts and the feedback element is a magnet.

In another preferred form, determining that the lever locking mechanism is in the locked position further comprises causing the normally closed contacts to open if the presence of the magnetic field is detected, and generating a signal to open an electrical circuit.

In another preferred form, determine that the lever locking mechanism is in the unlocked position further comprises causing the normally closed contacts to remain closed if the presence of the magnetic field is not detected, and generating another signal to close the electrical circuit.

In another preferred form, providing the determined locked or unlocked position of the lever locking mechanism to the user includes generating visual representations of the locked or unlocked position on via a user interface.

In another preferred form, providing the determined locked or unlocked position of the lever locking mechanism to the user includes generating audio representations of the locked or unlocked position via a user interface.

DETAILED DESCRIPTION

Figure 1:
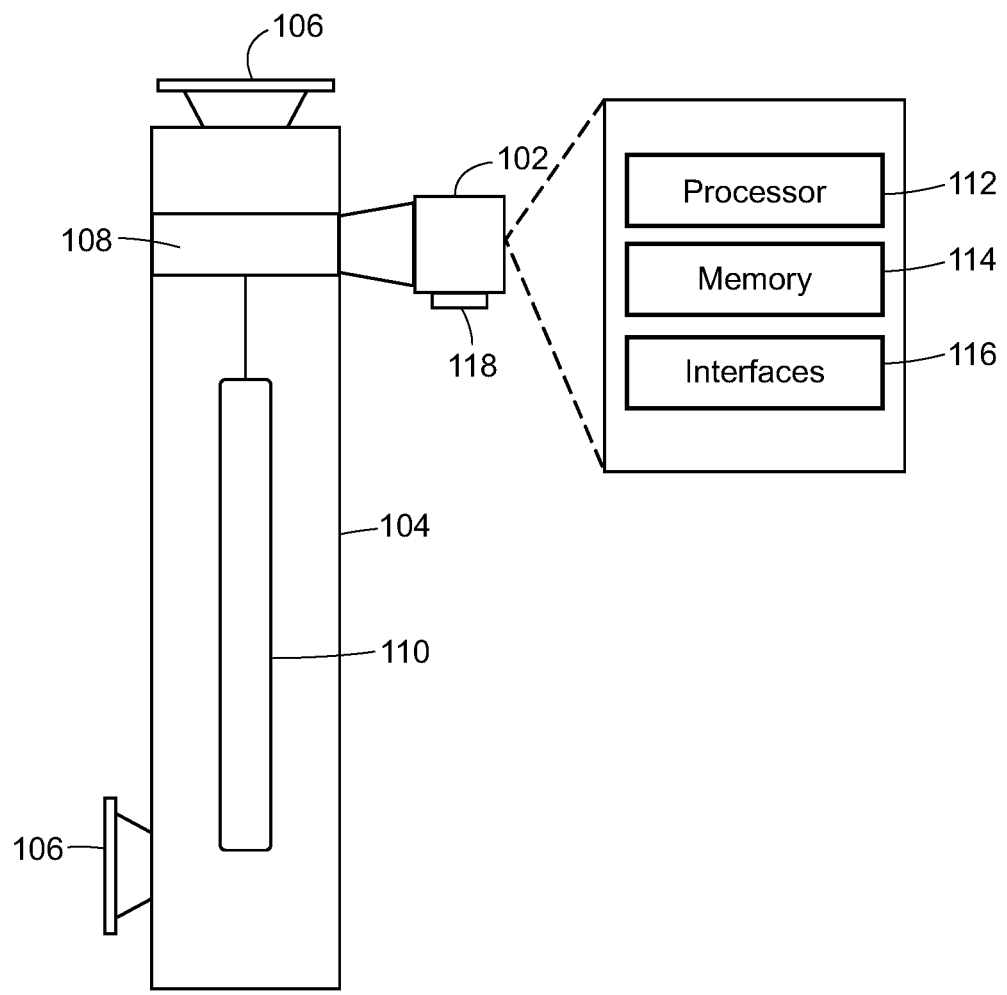
FIG. 1 is a perspective view of an example liquid level controller mounted to a process vessel.

FIG. 1 illustrates a perspective view of an example liquid level controller 102 mounted to a process vessel 104 used in a process plant or system. For example, the process vessel 104 may be a tank, a reboiler, a distillation column, etc. The process vessel 104 includes one or more ports 106 that allow the process vessel 104 to be filled with a fluid or liquid. The liquid level controller 102 operates to measure the level of the liquid in the process vessel 104. Alternatively or additionally, the liquid level controller 102 may be used to measure the level of the interface between two liquids, or the density of the liquid in the process vessel 104.

Generally, the liquid level controller 102 includes a lever assembly (not shown) that is coupled to a torque tube 108, which in turn is attached to a displacer 110 submerged in the liquid inside the process vessel 104. A change in the level of the liquid exerts a buoyant force on the displacer 110. This change causes a change in the position of the displacer 110 (e.g., a vertical movement), which rotates the torque tube 108. The rotary motion of the torque tube 108 is then transferred to the lever assembly. More particularly, the rotary motion moves a magnet attached to the lever assembly, and thus changing the magnetic field sensed by a magnetic sensor such as a Hall effect sensor. The magnetic sensor converts the changing magnetic field into a varying signal, which corresponds to the change in the level of the liquid inside the process vessel 104.

The liquid level controller 102 also includes a processor 112, a memory 114, and one or more interfaces 116. The memory 114 stores instructions that may be executed by the processor 112 to operate the liquid level controller 102. The one or more interfaces 116 enable interactions between the liquid level controller 102 and a user or another device. For example, the one or more interfaces 116 may include a user interface that allows the user to configure or view information on the liquid level controller 102. As another example, the one or more interfaces 116 may include a communication interface that allows communication between the liquid level controller 102 and other peripheral equipment.

During shipment or other handling events, it is necessary to protect the liquid level controller 102 from damage. To do so, the liquid level controller 102 includes a lever locking mechanism 118 that is manually engaged by an operator to prevent the lever assembly from rotating. The lever locking mechanism 118 must be manually disengaged by the operator prior to calibrating the liquid level controller 102 or putting the liquid level controller 102 into operation. However, if the operator forgets or neglects to disengage the lever locking mechanism 118, then the lever assembly may fail which in turn may prevent the proper functioning of the liquid level controller 102.

Typically, the lever locking mechanism 118 is situated on the bottom or underside of the liquid level controller 102. As a result, the lever locking mechanism 118 is not easily visible to the operator. However, visual inspections are needed in order to determine whether or not the lever locking mechanism 118 is engaged. For example, current designs rely on visual cues (e.g., using "lock" and "unlock" symbols) to indicate the state of the lever locking mechanism 118.

In order to better facilitate the operator in detecting and/or monitoring the state of the lever locking mechanism 118, a sensor may be coupled to the lever locking mechanism 118. This sensor operates to determine the locked or unlocked position of the lever locking mechanism 118, which can then be displayed to the operator via a user interface. In this manner, the sensor provides a simple non-contact method for determining the state of the lever locking mechanism 118.

Figure 2A:
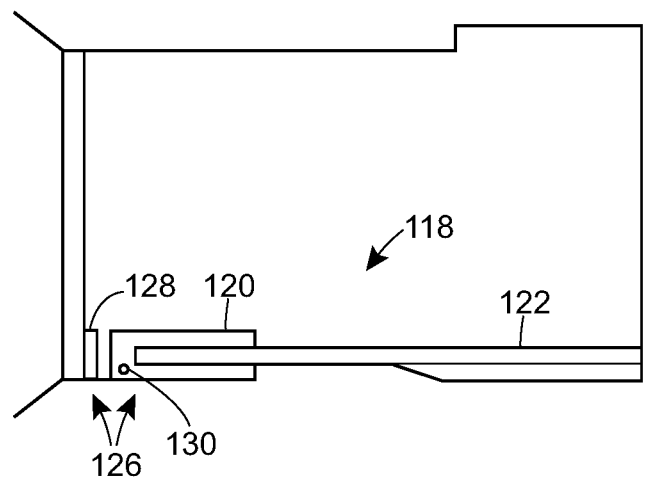
FIG. 2A is an underside view of the example liquid level controller of FIG. 1 that shows a lever locking mechanism in a locked position.
Figure 2B:
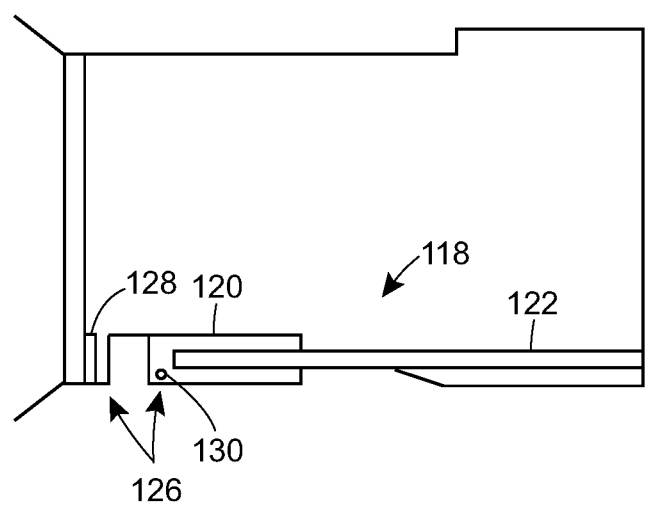
FIG. 2B is an underside view of the example liquid level controller of FIG. 1 that shows a lever locking mechanism in an unlocked position.

FIGS. 2A and 2B illustrate underside views of the liquid level controller 102 with the lever locking mechanism 118 of FIG. 1. The operator can slide a lock 120 along a lock handle 122 to manually engage or disengage the lever locking mechanism 118.

To determine the locked or unlocked position of the lever locking mechanism 118, a sensor 126 is coupled to the lever locking mechanism 118. Generally, the sensor 126 includes a sensing element 128 and a feedback element 130. When the lock 120 is engaged, the sensing element 128 will detect the presence of the feedback element 130. Thus, the lever locking mechanism 118 is said to be in the locked position (see FIG. 2A). On the other hand, if the lock 120 is disengaged, then the sensing element 128 will not detect the presence of the feedback element 130. Accordingly, the lever locking mechanism 118 is said to be in the unlocked position (see FIG. 2B).

In the embodiment of FIGS. 2A and 2B, the sensing element 128 is a reed switch and the feedback element 130 is a magnet. The reed switch 128 is an electrical switch that comprises a pair of contacts on ferrous metal reeds. The contacts may be normally open. As such, the contacts will close when a magnetic field (e.g., produced by the magnet 130) is near the contacts. This indicates that the lever locking mechanism 118 is engaged in the locked position. Once the magnetic field is removed (e.g., the magnet 130 is pulled a distance away), the contacts will return to their normally open position indicating that the lever locking mechanism 118 is now disengaged in the unlocked position. Alternatively, the contacts may be normally closed. As such, the presence of the magnetic field from the magnet 130 will cause the contacts to open. In this scenario, the opening of the contacts indicates the locked position, while closing the contracts indicates the unlocked position.

In an example embodiment, opening and closing of the contacts will generate signals to close or open an electrical circuit. For example, if the contacts are normally open, then the presence of the magnetic field will cause the contacts to close. The closing of the contacts will generate a signal to close the electrical circuit, which in turn indicates that the lever locking mechanism 118 is in the locked position. The removal of the magnetic field will cause the contacts to open again. The re-opening of the contacts will generate another signal open or break the electrical circuit, which in turn indicates that the lever locking mechanism 118 is in the unlocked position.

By using the sensor 126 in the lever locking mechanism 118, it is possible to alert the operator on the state of the lever locking mechanism 118 before the liquid level controller 102 is put into operation. For example, the operator can be informed or determine whether the lever locking mechanism 118 is in the locked or unlocked position via information displayed in a user interface (e.g., one of the interfaces 116 of FIG. 1).

In some embodiments, the sensing element 128 may be another type of magnetic field-sensing device such as a Hall effect sensor, a magneto-resistor, a giant magneto-resistive bridge, a flux gate, etc. Further, in some embodiments, the sensor 126 including the sensing element 128 and the feedback element 130 may be a separate unit that is incorporated into the lever locking mechanism 118, while in other embodiments, the sensor 126 may be an integrated part of the lever locking mechanism 118.

Figure 3:
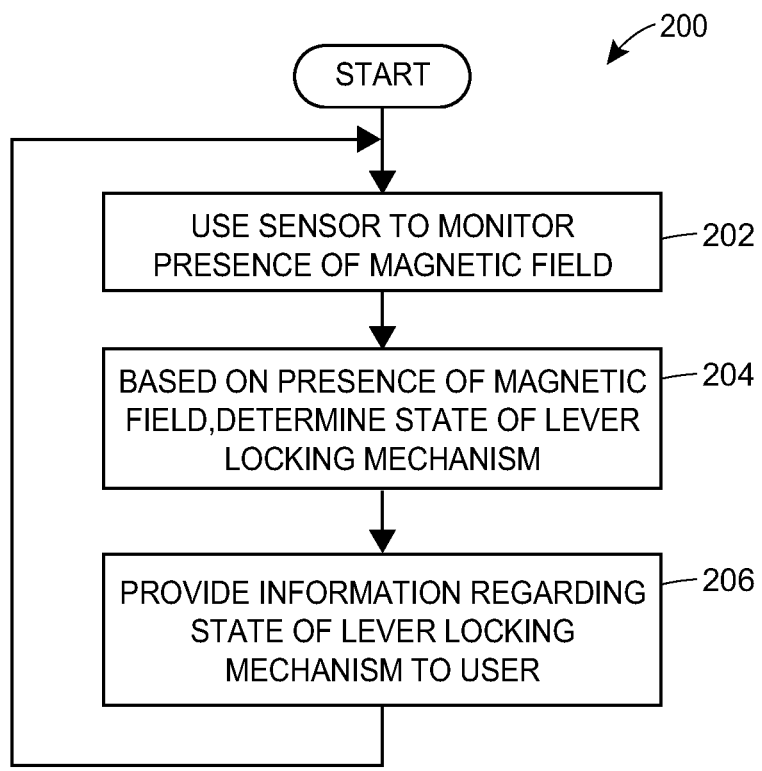
FIG. 3 is a flowchart representative of an example method for detecting lever locking positions on the example liquid level controller of FIG. 1.

FIG. 3 illustrates a flowchart of an example method 200 for detecting lever locking positions on a liquid level controller. The method 200 may include one or more blocks, routines or functions in the form of computer executable instructions that are stored in a non-transitory computer-readable medium (e.g., 114 of FIG. 1) and executed using a processor (e.g., 112 of FIG. 1). The liquid level controller may include a lever locking mechanism (e.g., 118 of FIG. 1) with a sensor (e.g., 126 of FIG. 2) that is manually engaged or disengaged. Accordingly, the method 200 may be executed to use the sensor to determine whether the lever locking mechanism is locked or unlocked.

The method 200 begins by using the sensor to monitor the presence of a magnetic field (block 202). To do so, the method 200 may utilize a sensing element of the sensor which may be a reed switch, for example. The magnetic field may be produced by a feedback element, such as a magnet, that is also part of the sensor. The reed switch may comprise a pair of contacts that are either normally open or normally closed. Thus, when the magnet producing the magnetic field is brought near the reed switch, the contacts will either close or open accordingly.

As an example, for normally open contacts, the method 200 may detect the presence of the magnetic field by determining whether the contacts are closed. If the contacts are determined to be closed, then the magnetic field is present. However, if the contacts are determined to be open, then no magnetic field is present or near.

Based on the presence of the magnetic field, the method 200 proceeds to determine the state of the lever locking mechanism (block 206). Continuing with the above example, if the contacts are closed, then the method 200 may generate a signal to indicate that the lever locking mechanism is engaged in the locked position. On the other hand, if the contacts are open (e.g., the magnetic field is absent or removed), then the method 200 may generate another signal to indicate that the lever locking mechanism is disengaged in the unlocked position. In an example implementation, the method 200 may generate signals to close or open an electrical circuit in order to indicate whether the lever locking mechanism is engaged or disengaged.

Next, the method 200 provides information on the state of the lever locking mechanism to a user (block 208). For example, the method 200 may generate visual representations (e.g., symbols, icons, text, etc.) via a user interface to indicate the locked or unlocked position of the lever locking mechanism. As another example, the method 200 may generate audio representations (e.g., beeping sounds) via the user interface to inform the user whether the lever locking mechanism is in the locked or unlocked position.

After displaying the state of the lever locking mechanism, the method 200 may return to the beginning of block 202 to continuously monitor and provide information on the state of the lever locking mechanism.

The following additional considerations apply to the foregoing discussion. Throughout this specification, plural instances may implement functions, routines, or operations structures described as a single instance. Although individual functions and instructions of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of functions, components, modules, blocks, or mechanisms. Functions may constitute either software modules (e.g., non-transitory code stored on a tangible machine-readable storage medium) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain functions. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example functions and methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or functions described herein may be at least partially processor-implemented. For example, at least some of the functions of a method may be performed by one or processors or processor-implemented hardware modules. The performance of certain of the functions may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the functions may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Upon reading this disclosure, those of skill in the art will appreciate still additional alternative structural and functional designs for a system and method for detecting lever locking positions on a liquid level controller can be used as well or instead. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The invention claimed is:

1. A computer-implemented method for detecting lever locking positions on a liquid level controller, the method comprising:
   detecting, by one or more processors, presence of a magnetic field produced by a feedback element of a sensor, the presence of the magnetic field being detected using a sensing element of the sensor and the sensor being coupled to a lever locking mechanism of the liquid level controller, wherein the sensing element includes normally closed contacts;
   causing, by one or more processors, the normally closed contacts to open if the presence of the magnetic field is detected;
   determining, by one or more processors, that the lever locking mechanism is in a locked position if the presence of the magnetic field is detected;
   determining, by one or more processors, that the lever locking mechanism is in an unlocked position if the presence of the magnetic field is not detected;
   generating, by one or more processors, a signal to open an electrical circuit to indicate that the lever locking mechanism is in the unlocked position; and
   providing, by one or more processors, the determined locked or unlocked position of the lever locking mechanism to a user.

2. The computer-implemented method of claim 1, wherein the sensing element is a reed switch and the feedback element is a magnet.

3. The computer-implemented method of claim 1, wherein the sensing element is a Hall effect sensor.

4. The computer-implemented method of claim 3, further comprising:
   causing, by one or more processors, the normally closed contacts to remain closed if the presence of the magnetic field is not detected.

5. The computer-implemented method of claim 1, wherein the sensing element is a magnetic field sensing device.

6. The computer-implemented method of claim 1, wherein the sensing element is a magneto-resistor.

7. The computer-implemented method of claim 1, wherein the sensing element is a giant magneto-resistive bridge.

8. The computer-implemented method of claim 1, wherein providing the determined locked or unlocked position of the lever locking mechanism to the user includes generating visual representations of the locked or unlocked position on via a user interface.

9. The computer-implemented method of claim 1, wherein providing the determined locked or unlocked position of the lever locking mechanism to the user includes generating audio representations of the locked or unlocked position via a user interface.

10. A non-transitory computer-readable storage medium including computer-readable instructions to be executed on one or more processors of a system for detecting lever locking positions on a liquid level controller, the instructions when executed causing the one or more processors to:

detect presence of a magnetic field produced by a feedback element of a sensor, the presence of the magnetic field being detected using a sensing element of the sensor and the sensor being coupled to a lever locking mechanism of the liquid level controller, wherein the sensing element includes normally closed contacts;

cause the normally closed contacts to open if the presence of the magnetic field is detected;

determine that the lever locking mechanism is in a locked position if the presence of the magnetic field is detected;

determine that the lever locking mechanism is in an unlocked position if the presence of the magnetic field is not detected;

generate a signal to open an electrical circuit to indicate that the lever locking mechanism is in the unlocked position; and provide the determined locked or unlocked position of the lever locking mechanism to a user.

11. The non-transitory computer-readable storage medium of claim 10, wherein the sensing element is a reed switch.

12. The non-transitory computer-readable storage medium of claim 10, wherein the sensing element is a magnetic field-sensing device.

13. The non-transitory computer-readable storage medium of claim 10, wherein the sensing element is a giant magneto-resistive bridge.

14. The non-transitory computer-readable storage medium of claim 10, wherein the sensing element is a flux gate.

15. The non-transitory computer-readable storage medium of claim 10, wherein the sensing element is a magneto-resistor.

16. The non-transitory computer-readable storage medium of claim 10, wherein the sensing element is a Hall effect sensor.

17. The non-transitory computer-readable storage medium of claim 10, wherein the instructions to provide the determined locked or unlocked position of the lever locking mechanism to the user include instructions that, when executed, generate visual representations of the locked or unlocked position on via a user interface.

18. The non-transitory computer-readable storage medium of claim 10, wherein the instructions to provide the determined locked or unlocked position of the lever locking mechanism to the user include instructions that, when executed, generate audio representations of the locked or unlocked position via a user interface.

19. A system for detecting lever locking positions on a liquid level controller, the system comprising:

a sensor coupled to a lever locking mechanism of the liquid level controller, the sensor including a sensing element and a feedback element, wherein the sensing element includes normally closed contacts; and a device coupled to the sensor, the device including a memory having instructions for execution on one or more processors, the instructions when executed by the one or more processors, cause the device to:

use the sensing element to detect a magnetic field produced by the feedback element;

cause the normally closed contacts to open if the presence of the magnetic field is detected;

determine that the lever locking mechanism is in a locked position if the presence of the magnetic field is detected;

determine that the level locking mechanism in in an unlocked position if the presence of the magnetic field is not detected;

generate a signal to open an electrical circuit to indicate that the lever locking mechanism is in the unlocked position; and provide the determined locked or unlocked position of the lever locking mechanism to a user.

20. The system of claim 19, wherein the sensing element is a reed switch.

21. The system of claim 19, wherein the sensing element is a Hall effect sensor.

* * * * *

UNITED STATES PATENT AND TRADEMARK OFFICE
CERTIFICATE OF CORRECTION

PATENT NO. : 9,874,043 B2
APPLICATION NO. : 15/135306
DATED : January 23, 2018
INVENTOR(S) : Lei Zhang It is certified that error appears in the above-identified patent and that said Letters Patent is hereby corrected as shown below:

In the Specification

At Column 2, Line 58, "position on via a" should be -- position via a --.

At Column 5, Line 40, "(block 206)." should be -- (block 204). --.

At Column 5, Line 52, "(block 208)." should be -- (block 206). --.

In the Claims

At Column 8, Line 57, "position on via a" should be -- position via a --.

At Column 10, Line 3, "position on via a" should be -- position via a --.

At Column 10, Line 28, "level" should be -- lever --.

At Column 10, Line 28, "in in an" should be -- is in an --.

Signed and Sealed this
Twenty-eighth Day of August, 2018

Andrei Iancu
*Director of the United States Patent and Trademark Office*